Feb. 28, 1933.　　　　E. W. KELLOGG　　　　1,899,571

FILM DRIVING MECHANISM

Filed Nov. 12, 1930

Inventor:
Edward W. Kellogg,
by Charles W. Mullan
His Attorney.

Patented Feb. 28, 1933

1,899,571

UNITED STATES PATENT OFFICE

EDWARD W. KELLOGG, OF MOORESTOWN, NEW JERSEY, ASSIGNOR TO GENERAL ELECTRIC COMPANY, A CORPORATION OF NEW YORK

FILM DRIVING MECHANISM

Application filed November 12, 1930. Serial No. 495,192.

My invention relates to apparatus for recording sound on a film or for reproducing sound from a film record and particularly to that part of the apparatus by means of which the film is driven. It is the object of my invention to provide an improved film driving mechanism in such apparatus by which the film may be driven at a uniform speed under the control of a sprocket.

In my copending application, Serial No. 295,780, filed July 27, 1928, and assigned to the same assignee as the present application, I have disclosed and claimed film driving apparatus including a driving sprocket and a drum wherein the film passes from the drum to the sprocket and the tension of the film therebetween serves in part to rotate the drum. According to my present invention I have provided a construction whereby the film passes from the sprocket to the drum and I apply to the drum a driving torque which is slightly in excess of that required to overcome the bearing friction of the drum with its associated flywheel and pressure roller. The torque applying means which I employ is of a yielding character such that the torque supplied to the drum increases as the drum speed decreases. As so constructed when there is no film in the apparatus the drum attains a speed which is slightly greater than that attained during normal operation.

My invention is adapted to form a part of apparatus for recording sound on a film, for reproducing sound from a film record or for any other use where uniform vibrationless movement of the film is a desideratum. I have chosen to illustrate my invention as forming a part of a photographic sound recorder wherein an exposing narrow beam of light modulated by the sound is directed on the film.

My invention will be better understood from the following description taken in connection with the accompanying drawing, and its scope will be pointed out in the appended claims.

Figure 1:
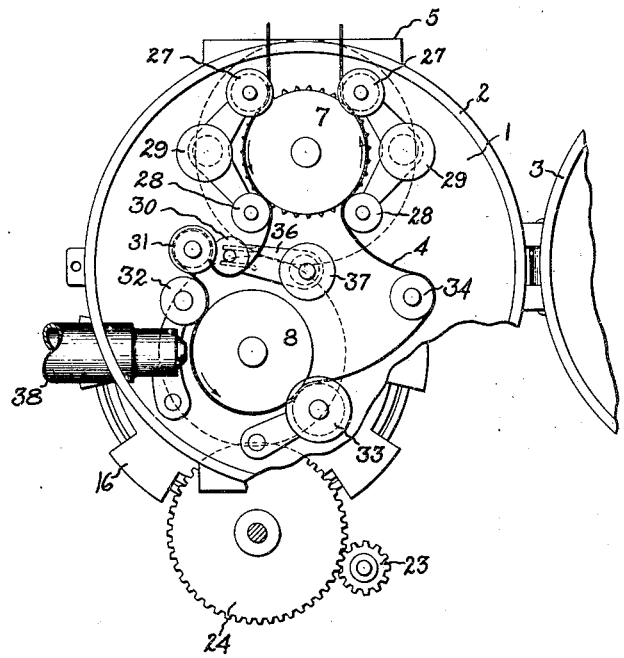
Figure 2:
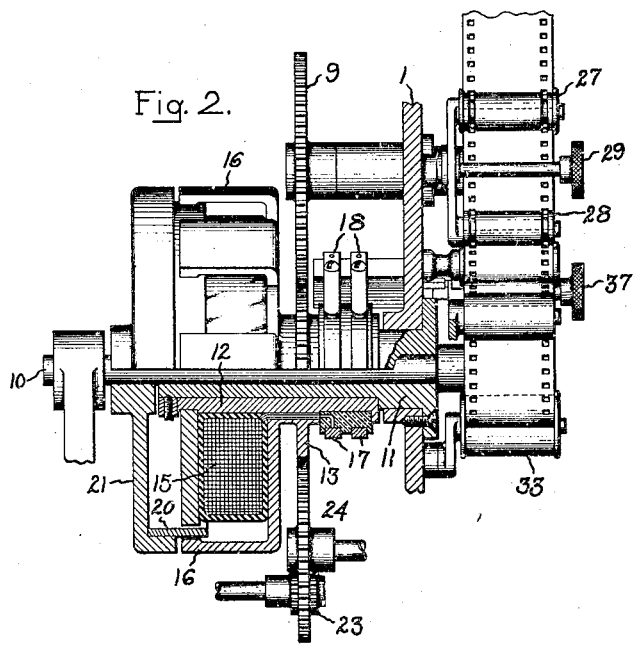

Referring to the drawing, Fig. 1 is a front view and Fig. 2 is a side view partly broken away of one embodiment of my invention.

In the drawing the frame 1 has a flange portion 2 which in cooperation with the door 3 forms a light tight enclosure for the film 4. A suitable film magazine of a well known form, not shown. is adapted to connect with the top of the casing at the surface 5. Within the casing the film is moved jointly by the sprocket 7 and a drum 8. The sprocket shaft is journaled in the frame 1 and has the gear 9 mounted on that end thereof opposite the sprocket. Drum shaft 10 is journaled in the bearing sleeve 11 which is secured in the frame 1. Surrounding sleeve 11 is the sleeve 12 the middle portion of which forms the gear 13 meshing with gear 9. The rear portion of sleeve 12 constitutes the frame of an electromagnet having the winding 15 and the polar projections 16. On the front end of sleeve 12 are the slip rings 17 to which the terminals of the winding 15 connect and against which press the brushes 18 whereby current is supplied to the rotating electro-magnet. Between the poles of the magnet is the conducting ring or armature 20 which is supported on the flanged disk 21 mounted on the shaft 10. Disk 21 and armature 20 are of sufficient weight to constitute a flywheel having the desired inertia to insure uniform rotation of the drum 8. For rotating the drum and the sprocket I have shown the pinion 23 which may be rotated by any suitable means such, for example, as a synchronous motor. The pinion 23 meshes with gear 24 which in turn meshes with gear 13.

As will be seen from Fig. 1, the film engages opposite sides of the sprocket 7 upon entering and leaving the casing. It is normally held in engagement with the sprocket by means of the usual sprocket guide rollers 27 and 28 which may be withdrawn from the sprocket or moved there against by the use of well known eccentric means controlled by the knobs 29. In approaching the drum the film passes from the sprocket guide roller 28 to the idler 30 thence around the flanged guide roller 31 to pressure roller 32 and to the drum. Upon leaving the drum the film passes under pressure roller 33 thence over idler 34 to the other sprocket guide roller 28 and the sprocket. To facilitate threading the film, idler 30 has its shaft arranged to be moved in guides and is carried on the end of arm 36 which by means of an eccentric mounting and knob 37 can be moved to withdraw the idler from the guide roller 31. When idler 30 is in the operating position illustrated the film is caused thereby to have the desired large angle of wrap on the guide roller 31. To facilitate threading of the film pressure rollers 32 and 33 are mounted on suitable arms in the well known manner permitting the rolls to be swung away from the drum.

By means of the gear connection illustrated the sprocket is positively driven from the pinion 23. The drum, however, is driven magnetically through the electro-magnet and armature members. The gearing is so designed that the magnet rotates approximately 15% faster than the drum, and the strength of electro-magnet is adjusted so that with this speed difference, the desired amount of forward torque is supplied to the armature 20. No slippage of the film on the drum, however, is allowed to occur, the rollers 32 and 33 holding the film tightly against the drum. The advantage of causing the magnetic drive to supply slightly more rather than slightly less torque than is required to overcome friction, is that with the former condition the film exercises a restraining action on the rotation of the drum whereby it is under slight tension on the lead-on side of the drum and is relatively loose on the pay-off side thereof. This slight tension on the lead-on side is favorable to satisfactory guiding of the film, since it causes the film to wrap snugly around the guide roller 31 and the intermediate roller 32 and to assume a definite position on the drum. It is likewise favorable, when pressure rollers are used as in this case, to have a very loose loop where the film issues from between the drum and pressure roller. If the film is tight at this point it sometimes becomes unstable and tends to run off the end of the drum.

The roller 34 is so placed as to assist the film in staying snugly against the drum. The shape of the loop around roller 34 is such that, in view of the natural stiffness of the film, the lower part of the loop is under a slight tension, and if roller 33 were moved away from the drum, the film would still remain in contact with the drum at the point where the recording is taking place. This would not necessarily be true if roller 34 were omitted. If the film had to be pushed out from between pressure roller 33 and the drum 8, the conditions for the film keeping tight on the drum would be less favorable, since slight creepages can occur in spite of the pressure with which the film is held against the drum by the pressure rollers. The tension on the film, however, in this lower, or pay-off loop is considerably less than the tension in the loop on the lead-on side.

Extending through the flange 2 is shown a portion 38 of the optical system by which a narrow beam of light modulated in accordance with the sound to be recorded is directed on the film at a point thereof where the film is supported on the face of the drum.

It will be obvious to those skilled in the art that various modifications in the above described embodiment of my invention may be made. For example permanent magnets may be employed instead of an electro-magnet, and various well known expedients may be employed to effect the adjustment of the torque such for example as shifting the magnet relative to the flange, or if the magnetic drive be designed to exert a greater forward torque than is required the excess may be absorbed by an adjustable brake of a suitable well known construction depending likewise on the reaction between a magnet and a conductor moving relative thereto, or any suitable form of smooth acting brake may be used. Another obvious modification would consist in interchanging the location of the magnet and conductor, mounting the magnet on the drum shaft and driving the conductor at a speed above that of the drum. It will be apparent that these and various other modifications may be made without departing from the spirit and scope of my invention which modifications I aim to cover by the appended claims.

What I claim as new and desire to secure by Letters Patent of the United States, is:

1. Film driving apparatus comprising a sprocket and a drum each arranged to engage the film, and means for driving both the sprocket and the drum, said means tending to drive the drum at a greater speed than the sprocket, the speed of the drum being restrained by the film leaving the sprocket.

2. Film driving apparatus comprising a sprocket and a drum each arranged to engage the film, and driving means for the sprocket and the drum, said driving means being constructed and arranged to apply to the drum a torque in excess of that required to overcome friction, the rotation of the drum being restrained by the film passing thereto from the sprocket.

3. Film driving apparatus comprising a sprocket and a drum, the film passing from the sprocket to the drum, a common driving member for both of said members, and means connecting the driving member with the drum including a slip device wherein continuous relative motion occurs, the torque exerted by said device being in excess of that required to overcome friction.

4. Film driving means comprising a drum, a flywheel associated therewith, a sprocket arranged to feed the film to the drum, a guide roller between the sprocket and drum, a driving member, and a slip connection between said member and the drum tending to overdrive the drum thereby slightly tensioning the film.

5. Film driving apparatus comprising a drum, a sprocket arranged to feed the film thereto, a guide roller between the sprocket and the drum, an idler arranged to increase the wrap of the film about the guide roller and driving means for the drum including a slip connection whereby the film is slightly tensioned between the drum and the sprocket.

6. Film driving apparatus comprising a drum, a sprocket arranged to feed the film thereto, a member operatively connected to drive both of said members, an idler, a guide roller having a fixed position and a drum engaging pressure roller arranged in series between the sprocket and the drum and relatively positioned to cause a large angle of wrap of the film on the guide roller, the drum at all times being driven to cause a slight tension in the film between the drum and the sprocket.

7. Film driving apparatus comprising a sprocket, a drum arranged to receive the film from the sprocket, the film on the face of the drum being adapted to have a narrow light beam projected thereon, and a driving member operatively connected with said sprocket and drum, the connection of the driving member with the drum including relatively rotatable magnet and armature members arranged to overdrive the drum whereby the film approaching the drum is slightly tensioned.

8. Film driving apparatus comprising a sprocket arranged to engage the film at points on opposite sides thereof, a drum arranged to engage a loop in the film between said points of engagement, a guide roller for the film at the lead-on side of the drum, means for driving the sprocket and the drum, said means tending to overdrive the drum and excessive movement of the drum being restrained by the tension of the film in the lead-in side thereof.

In witness whereof, I have hereunto set my hand this 5th day of November, 1930.

EDWARD W. KELLOGG.